UNITED STATES PATENT OFFICE

ISRAEL ROSENBLUM, OF JACKSON HEIGHTS, NEW YORK

RESIN COMPLEX AND METHOD OF PRODUCING THE SAME

No Drawing.  Application filed June 14, 1929. Serial No. 371,066.

My invention relates to fusible and soluble condensation products of a new and improved type derived from the interaction of an organic salt of a metal with a substance or a mixture of substances capable of yielding complexes adapted for use in varnishes, or derived from the interaction of such an organic salt-containing product and another substance capable of combining therewith.

More specifically, my invention relates to complex condensation products derived from the interaction of an organic salt of a metal, a phenol, or a mixture of phenols, an aldehyde, or a mixture of aldehydes, preferably in the presence of a solvent, such as drying or non-drying oils, acids of high molecular weight such as may be obtained upon hydrolysis of edible and non-edible oils, neutral or acid resinous bodies, for example, coumarones, asphaltums, pitches such as rosin pitch or coal tar pitch, fossil gums, colophony, etc. and their esters, either untreated or pre-treated, as by being heated to or below a cracking temperature, and a polyhydric alcohol, such as glycerol, or a hydroxyl containing ester gum or condensate.

In my co-pending application, Serial No. 336,632, filed January 31, 1929, I have described a process for obtaining complex resins of high molecular weight, low viscosity and wide range of solubility by heating a phenol, an aldehyde, an organic salt of a metal, and simultaneously or subsequently adding a quantity of cracked rosin. Glycerine is added either in the free state or combined with the cracked rosin in the form of a mixture of glycerol mono, di and tri-abietate, the object of the cracking being to favor the formation of low acid value gums and of the mono and di-esters, which esters do not precipitate in ethyl acetate solutions. In this way, a highly complex resin is obtained which is superior to products heretofore obtained from a phenol, an aldehyde, rosin and glycerine.

I have found that resinous complexes of highly improved properties may be obtained without first cracking or otherwise pretreating the rosin or its equivalent, provided only that a phenol-aldehyde-organic salt complex is employed in the process. I have found further that the presence of a phenol-aldehyde-organic salt complex exerts a very favorable influence upon resinous bodies, whether acidic in character like colophony, or neutral like esterified rosin or coumarones, particularly where such complex combines chemically or forms double compounds with such resinous bodies. While my invention, therefore, is capable of wide application, I shall describe the same more in detail in connection with the production of substantially neutral resin complexes derived from a phenol, an aldehyde, a neutral resin, and a polyhydric alcohol, such as glycerol.

It is well known that a phenol, such as phenol or one of its homologues, and an aldehyde, such as formaldehyde, will combine under certain conditions to produce a synthetic resin whose properties will depend upon the ratio of phenol to formaldehyde and upon the extent to which the condensation and polymerization have been permitted to proceed. If the reaction is properly controlled, an initial or intermediate product will be obtained which is fusible and soluble in a number of organic solvents, so that such product may be used as a varnish gum. This initial fusible and soluble condensate may, upon the addition thereto of an indurating or hardening agent, such as formaldehyde in one of its forms, or hexamethylenetetramine, and upon the application of heat and pressure, be polymerized to form an infusible and insoluble product which can no longer be used as a varnish gum. If an excess of aldehyde has been used in the first reaction, e. g., more than 0.6 mol of formaldehyde to 1 mol of phenol in the case of a phenol-formaldehyde resin, such excess of aldehyde will act as a hardening agent for the fusible, soluble intermediate product, which can then be converted to the final infusible, insoluble state merely upon heating the same, preferably under pressure. Such intermediate product containing an excess of aldehyde is consequently not stable as it will be converted spontaneously into the final insoluble product on heating, and is therefore not suitable for use in varnishes.

It has already been proposed to render such intermediate products stable, i. e. permanently fusible and soluble and therefore adapted for use in varnishes, by employing an excess of phenol or by carrying out the reaction with an excess of formaldehyde in the presence of rosin. Both of these measures, however, have serious disadvantages. Where an excess of the phenol is used, not only does the resin have the strong odor of phenol, but it has the disadvantages of having a low melting point, poor solubility in mineral spirits, and a high viscosity. When an excess of formaldehyde is used in the presence of rosin or colophony and the product later esterified, then gums of the higher melting point type result, but these have a very poor solubility in mineral spirits and a high viscosity; the high melting point may be sacrificed for solubility, but this in turn is objectionable. One of the reasons for these results is that the final resin thus obtained is a mechanical mixture almost totally or to a major extent, and as a result the properties of the phenol-formaldehyde condensate, which is not combined with the natural resin, dominate the final product.

When, on the other hand, rosin or colophony is heated in the presence of the above-mentioned phenol-aldehyde-organic salt complex, then not only is the course of dry-distillation of the rosin or colophony altered, but should a polyhydric alcohol such as glycerol be added to the complex, then the esterification also pursues a different course which can best be understood from the following results which I have observed during my researches. When ordinary rosin is esterified with glycerol at elevated temperatures, intermediate products, which appear to be of a ketonic or lactonic character, are formed. When the temperature of the reaction is raised (for instance, to speed up the reaction) these intermediate compounds break up and form acids which attack any mono and di-glyceridic esters (i. e. partially esterified glycerol) which may be present and convert them into the corresponding tri-esters. To produce a resin or gum of high quality it is necessary to destroy these ketonic or lactonic compounds, which generally comprise 5 to 10% of the reacting mass, because they unfavorably affect the properties of the varnish made of the gum, and should such gum be used in conjunction with acetic acid esters such as ethyl acetate, then these ketones or lactones would precipitate out of solution. These intermediate bodies are neutral in reaction, are quite insoluble in the usual varnish solvents, and are rather crystalline and non-colloidal in nature and consequently do not form a film on drying.

Researches conducted by me have shown that under certain conditions the esterification of the glycerol in the presence of colophony may be made to take a different course from that just described and either the formation of the intermediate ketonic or lactonic bodies avoided, or, if formed, they are chemically combined or destroyed. I have found that the presence of a complex formed by reacting a phenol and an aldehyde in the presence of an organic salt of a metal, such as zinc, and preferably of a metal salt of high molecular weight or of resinous character, such as zinc rosinate or abietate, favorably affects the course of the reaction and causes esterification to take place at a lower temperature without showing the presence of the above-mentioned ketonic or lactonic bodies, which bodies may have entered into reaction with the complex or may not be present at all, the final product being a complex resin of low viscosity, high melting point and excellent solubility having superior, adhesive and film-forming properties.

It is an object of the present invention to produce improved fusible and soluble complex bodies suitable for use in varnishes. In particular it is an object of the present invention to produce permanently fusible and soluble condensation products of high molecular weight, high melting point and low viscosity, which will be stable when exposed to atmospheric conditions. It is also an object of this invention to produce a synthetic resin of the above-indicated character having a low acid number and a great range of solubility in organic solvents, so as to be capable of standing considerable thinning or dilution without precipitating, particularly when thinned with the mineral spirits commonly used in varnish-making. It is a further object of the invention to produce a permanently fusible synthetic soluble resinous complex which, as compared with known resins, will have a higher melting point for the same viscosity and a lower viscosity for the same melting point, and which will stand more thinning with mineral spirits as compared with phenol-formaldehyde condensates hitherto produced and having the same melting point.

In carrying out my invention, I may heat any known varnish ingredient, such as a phenol-formaldehyde resin when only partially condensed, and a resinous solvent, such as a natural resin, pitch, asphaltum, etc., in the presence of an organic salt of a metal, such as the resinate, abietate, oleate, tungate, stearate, acetate, etc., of zinc, calcium, barium, strontium, manganese, lead, cobalt, and, in certain instances, the corresponding salts of the alkali metals, etc., preferably until combination takes place and a more complex molecule is formed. I prefer to employ an organic salt of zinc of high molecular weight, preferably a resinate, such as zinc abietate. In applying my invention to the production of an improved varnish gum of low acid number and extraordinarily high molecular weight derived from a phenol, an aldehyde, rosin and glycerine, I may proceed as follows: I produce first a fusible, soluble phenol-aldehyde condensation product in the presence of an organic salt of a metal, preferably zinc abietate, and preferably in the presence also of a solvent which may be drying and non-drying oils, the acids thereof, a natural resin like rosin, Congo, etc., coumarones, asphaltum, pitches, etc. The phenol may be carbolic acid or any homologue or substitution product thereof, or a mixture of the same, while as the aldehyde I prefer to employ formaldehyde, though other aldehydes, or mixtures of aldehydes, may be used. The reaction is made to take place at elevated temperatures and is controlled in a manner well understood in the art. When the initial reaction, producing a fusible and soluble phenol-aldehyde-organic salt condensate, is complete, the water is removed and then rosin, or any other natural resin (if none or only a small quantity was present during the phenolic condensation), whether pre-treated or not, is added to the condensate, or the condensate in solution added to the natural resin. Either ordinary wood rosin or any fresh or fossil resin, such as Manila, Congo, kauri, copal, etc., may be employed. I prefer to use wood rosin obtained from stumps. To this mixture of condensate and natural resin I then add an excess of a polyhydric alcohol, preferably glycerol (based on the quantity of resin present), which upon heating combines with the resin (i. e. rosin) to form a relatively large quantity of mono and di-resinate. The mass is then heated up to about 250° C. to cause the glycerol mono and di-esters to combine with the initial condensation product to form a phenol-formaldehyde-zinc-abietate-glycerol-mono-and-di-resinate or abietate complex of very high molecular weight, high melting point, large range of solubility in varnish solvents, and of substantially neutral character, having an acid number about 10 or below. If desired, all of the raw materials, including the glycerol, may be mixed together and heated en masse, if desired, using the oxides of the above-mentioned metals so as to provoke the formation of the organic salt complex.

The organic salt appears to act both as a catalyzer for the (initial) condensation whereby the soluble phenol-aldehyde resin is produced, and as an arrester of the final reaction which ordinarily, as above stated, converts the initial or intermediate product to the final, infusible, insoluble state. The phenol-formaldehyde-organic salt complex has the property of altering the course of the dry distillation of the (resinous) solvents, which may be acidic, like colophony and other natural or synthetic resins, or neutral (ester gums), the final product being composed either of mixtures or compounds depending on the mutual affinity of the solvent and the phenol-formaldehyde-organic salt condensate; for instance, should the complex be added to tri-glyceridic gums produced from rosin, or added to coumarones, the final product will most probably be mainly a mixture. The final products are characterized by a lower viscosity and better solubility in mineral spirits when compared with known phenol-aldehyde resins of the same melting point. The favorable properties of my improved resin are most pronounced when the phenol-aldehyde-organic salt complex is present in an amount up to about 15%.

In order that my invention may be better understood, the same will be illustrated with the aid of the following examples, which are to be understood as being given by way of illustration and not by way of limitation.

*Example 1.*—A condensation complex derived from the interaction of 100 pounds of phenol or cresol, or a mixture of both, 30 pounds of zinc oleate or rosinate, or, for example, corresponding organic salts of calcium, barium, strontium, sodium, etc., and 270 pounds of 40% formaldehyde solution, in the presence of 1200 pounds of colophony, is heated by refluxing or under pressure at a temperature of from 150° to 220° C. The product is then dehydrated. A quantity of glycerine equivalent to about 14% of the weight of the colophony is then added and the temperature raised to about 260° C. or above. A resin of low acid number, high melting point, very low viscosity and excellent solubility is obtained.

*Example 2.*—A condensation complex derived from the interaction of 120 pounds of phenol or cresol, or a mixture of both, 40 pounds of zinc rosinate, 250 pounds of 40% formaldehyde solution, and 200 pounds of rosin is run into 1000 pounds of rosin which has been pre-heated to a temperature of from 150° to 250° C. After dehydrating the product, 15% of glycerine, based on the weight of rosin, is added and the temperature raised to about 260° C. A resinous complex of an acid value below 10 is obtained having a very low viscosity, a high melting point, and very good solubility in mineral spirits.

*Example 3.*—A complex derived from the interaction of 100 pounds of phenol or cresol, or a mixture of both, 50 pounds of zinc rosinate, 200 pounds of formaldehyde (40% solution) in the presence of a solvent such as 1000 pounds of tri-glyceridic rosin ester or cumarone resin is heated slowly to about 130° C. by refluxing or under pressure. When the reaction is advanced, the water is evaporated and the temperature raised to about 240° C. A practically neutral gum of high melting point, low viscosity, and very good solubility is obtained, the gum being also very resistant toward alkalies.

*Example 4.*—100 pounds of phenol or cresol, or a mixture of both, 60 pounds of zinc rosinate or zinc oleate, and 700 pounds of asphaltum are heated to a temperature of about 120–200° C. by refluxing or under pressure, the phenol being condensed with an amount of formaldehyde corresponding to that employed in any of the preceding examples. The product is dehydrated at about 150° C. and the temperature raised to about 270° C. A gum of good solubility, practically neutral, which is valuable because of its high melting point and flexibility, is obtained.

*Example 5.*—Instead of asphaltum, rosin pitch or any other pitch, such as stearin pitch, may be used in the process described in Example 4, and should the asphaltum or pitch be acidic it can be neutralized by any known method.

The quantity of zinc salt employed according to the above examples may be as high as 60% by weight of the phenol, which corresponds to approximately 7.5% calculated as metal oxide. Where the quantity of natural resin or natural resin esters is lower as compared with the amount of phenol employed than in the above examples, as described in my above mentioned copending application Serial No. 336,632, the quantity of organic metal salt may be lower; and in general, for best results, the quantity of organic metal salt, calculated as oxide, should not be considerably above 7.5% by weight of the phenol.

As will be clear from the above examples, varnish ingredients in general, such as resins, partially or completely esterified ester gums, drying and non-drying oils, coumarone resins, asphaltums, pitches, etc., may, in accordance with my invention, be improved, particularly for varnish-making purposes, by being heated with a phenol-aldehyde-organic salt complex formed either in the presence of such ingredient or separately.

The organic metal salt which is present during the condensation of the phenol and aldehyde becomes so intimately incorporated with the phenolic condensate which is produced that it cannot be separated from the condensate by any means known to me, and appears in fact to be chemically combined with the phenol-aldehyde condensate.

Variations may be resorted to within the scope of the appended claims without departing from the spirit of the invention.

I claim:

1. The method which comprises reacting a phenol, an aldehyde and an organic salt of a metal selected from the group consisting of the members of the alkali metal group and of the second group of the periodic system, lead, manganese and cobalt, in the presence of a natural resin, adding a polyhydric alcohol in quantity sufficient to form partial esters with such resin, and further heating the mass until a soluble resinous reaction product is obtained.

2. The method which comprises reacting a phenol, an aldehyde and an organic salt of resinous character of a metal selected from the group consisting of the members of the alkali metal group and of the second group of the periodic system, lead, manganese and cobalt in the presence of a natural resin, adding a polyhydric alcohol in quantity sufficient to form partial esters with such resin, and further heating the mass until a soluble resinous reaction product is obtained.

3. The method which comprises reacting a phenol, an aldehyde, and an organic salt of a metal of the second group of the periodic system in the presence of a natural resin, adding a polyhydric alcohol in quantity sufficient to form partial esters with such resin, and further heating the mass until a soluble resinous reaction product is obtained.

4. The method which comprises reacting a phenol, an aldehyde, and an organic salt of resinous character of a metal of the second group of the periodic system in the presence of a natural resin, adding a polyhydric alcohol in quantity sufficient to form partial esters with such resin, and further heating the mass until a soluble resinous reaction product is obtained.

5. The method which comprises reacting phenol, formaldehyde and zinc abietate in the presence of a natural resin, adding a polyhydric alcohol in quantity sufficient to form partial esters with such resin, and further heating the mass until a soluble resinous reaction product is obtained.

6. The method which comprises reacting phenol, formaldehyde and zinc abietate in the presence of a natural resin, adding glycerol in quantity sufficient to form substantial amounts of glycerol mono and di-esters with such resin, and further heating the mass until a soluble resinous reaction product is obtained.

7. The method which comprises reacting phenol, formaldehyde and zinc abietate in the presence of rosin, adding glycerol in quantity sufficient to form substantial amounts of glycerol mono and di-abietates, heating the mass to a temperature below about 250° C., and, after partial esterification of the rosin, further heating the mass until a soluble resinous reaction product is obtained.

8. The method which comprises reacting phenol, formaldehyde and zinc abietate in the presence of wood rosin, adding glycerol in quantity sufficient to form substantial amounts of glycerol mono and di-abietates, heating the mass to a temperature below about 250° C., and, after partial esterification of the rosin, further heating the mass until a soluble resinous reaction product is obtained.

9. The process which comprises reacting phenol, formaldehyde and an organic salt of resinous character of a metal selected from the group consisting of the members of the alkali metal group and of the second group of the periodic system, lead, manganese and cobalt in the presence of a natural resin, distilling off the water, and further heating the mass until a soluble resinouos reaction product is obtained.

10. The method which comprises reacting a phenol, an aldehyde, and an organic salt of a metal selected from the group consisting of the members of the alkali metal group and of the second group of the periodic system, lead, manganese and cobalt, until a phenol-aldehyde-organic salt reaction product is obtained, adding thereto a resinous substance containing resinous acids, and a polyhydric alcohol in excess of the theoretical quantity necessary to esterify such acids, and further heating the mass until a soluble, fusible resinous reaction product is obtained.

11. The method which comprises reacting a phenol, an aldehyde, an organic salt of a metal selected from the group consisting of the members of the alkali metal group and of the second group of the periodic system, lead, manganese and cobalt, an acidic resinous solvent and glycerol, the latter being present in excess of the theoretical quantity necessary to form tri-esters with the acids of said resinous solvent, and heating the mass until a fusible, soluble resinous reaction product is obtained.

12. The method which comprises reacting a phenol and an aldehyde in the presence of an organic salt of a metal selected from the group consisting of the members of the alkali metal group and of the second group of the periodic system, lead, manganese and cobalt, in an amount up to approximately 7.5%, calculated as oxide, of the amount of the phenol until a soluble, fusible phenol-aldehyde-organic salt reaction product is obtained.

13. The method which comprises reacting a phenol, an aldehyde, an organic salt of a metal selected from the group consisting of the members of the alkali metal group and of the second group of the periodic system, lead, manganese and cobalt, an organic acid of resinous character, and glycerol until a fusible, soluble resinous reaction product is obtained.

14. The method which comprises reacting a phenol, an aldehyde, and an organic salt of zinc in the presence of a natural resin until a fusible and soluble phenol-aldehyde-organic salt reaction product is obtained, adding glycerol, and then heating the mass until a soluble resinous mass is obtained.

15. A soluble resinous reaction product such as may be obtained by reacting a phenol and an aldehyde in the presence of a natural resin and of an organic salt of a metal selected from the group consisting of the members of the alkali metal group and of the second group of the periodic system, lead, manganese and cobalt, in an amount up to approximately 7.5%, calculated as oxide, of the amount of the phenol.

16. A soluble resinous reaction product such as may be produced by reacting a phenol and an aldehyde, in the presence of a natural resin and of a resinate of a metal selected from the group consisting of the members of the alkali metal group and of the second group of the periodic system, lead, manganese and cobalt, and a polyhydric alcohol, such product having a low viscosity and a great range of solubility in varnish solvents.

17. A soluble resinous reaction product such as may be produced by reacting a phenol and an aldehyde in the presence of a natural resin and of an organic salt of a metal selected from the group consisting of the members of the alkali metal group and of the second group of the periodic system, lead, manganese and cobalt, with a quantity of glycerol sufficient to form partial esters with such natural resin, said product having a low viscosity and a great range of solubility in varnish solvents.

18. A soluble resinous reaction product such as may be produced by reacting the mixture obtained by heating phenol and formaldehyde in the presence of zinc abietate and of a natural resin, with glycerol, such product having a low viscosity and a great range of solubility in varnish solvents.

19. The method which comprises condensing phenol and formaldehyde in the presence of a natural resin and of an organic salt of a metal selected from the group consisting of the members of the alkali metal group and of the second group of the periodic system, lead, manganese and cobalt, until a soluble resinous reaction product is obtained.

20. The method which comprises condensing phenol and formaldehyde in the presence of a natural resin and of a soap of a metal of the second group of the periodic system until a soluble resinous reaction product is obtained.

21. A resinous reaction product resulting from the interaction of phenol and formaldehyde in the presence of a natural resin and of an organic salt of a metal selected from the group consisting of the members of the alkali metal group and of the second group of the periodic system, lead, manganese and cobalt, and soluble in the common varnish and lacquer solvents.

22. A resinous reaction product resulting from the interaction of phenol and formaldehyde in the presence of a zinc soap and rosin, and soluble in the common varnish and lacquer solvents.

23. The process which comprises reacting phenol, formaldehyde and a salt of an acid of resinous character and of a metal selected from the group consisting of the members of the alkali metal group and of the second group of the periodic system, lead, manganese and cobalt, in the presence of a natural resin and of glycerol mono and di-resinate, distilling off the water, and further heating the mass until a soluble resinous reaction product is obtained.

24. The process which comprises reacting phenol, formaldehyde and zinc abietate in the presence of a resin and of glycerol mono and di-abietate, distilling off the water, and further heating the mass until a soluble resinous reaction product is obtained.

25. A soluble condensation product such as may be prepared by condensing phenol and formaldehyde in the presence of a zinc soap.

26. A soluble condensation product such as may be prepared by condensing phenol and formaldehyde in the presence of zinc abietate.

27. The method which comprises condensing a phenol, an aldehyde and an organic salt of a metal selected from the group consisting of the members of the alkali metal group and of the second group of the periodic system, lead, manganese and cobalt in an amount up to approximately 7.5%, calculated as oxide, of the amount of phenol in the presence of a natural resin until a phenol-aldehyde-metal salt reaction product is obtained.

28. A soluble phenol-aldehyde-polyhydric alcohol-resin acid ester reaction product having in chemical combination a metal selected from the group consisting of the alkali metals and of the second group of the periodic system, lead, manganese and cobalt.

29. A soluble phenol-formaldehyde-polyhydric alcohol-resin acid ester reaction product having in chemical combination a metal of the second group of the periodic system.

30. A soluble phenol-formaldehyde-glycerol-abietic acid ester reaction product having zinc in chemical combination.

31. A soluble phenol-formaldehyde-glycerol-resin acid reaction product having incorporated therein an organic zinc salt.

32. A soluble resinous condensate such as may be produced by the condensation of a phenol and an aldehyde in the presence of an organic salt of a metal selected from the group consisting of the members of the alkali metal group and of the second group of the periodic system, lead, manganese and cobalt, in an amount up to approximately 7.5%, calculated as oxide, of the phenol.

33. A soluble resinous condensate such as may be produced by the condensation of a phenol and an aldehyde in the presence of a salt of an organic acid of resinous character and of a metal selected from the group consisting of the members of the alkali metal group and of the second group of the periodic system, lead, manganese and cobalt in an amount up to approximately 7.5%, calculated as oxide, of the phenol.

34. The method which comprises condensing a phenol, an aldehyde and a salt of an acid of resinous character and of a metal selected from the group consisting of the members of the alkali metal group and of the second group of the periodic system, lead, manganese and cobalt, in an amount up to approximately 7.5%, calculated as oxide, of the amount of the phenol until a soluble phenol-aldehyde-metal salt reaction product is obtained.

35. The method which comprises condensing a phenol, an aldehyde and an organic salt of a metal of the second group of the periodic system in an amount up to approximately 7.5%, calculated as oxide, of the amount of the phenol in the presence of a natural resin until a soluble phenol-aldehyde-metal salt reaction product is obtained.

36. The method which comprises condensing phenol and formaldehyde in the presence of an organic salt of zinc in an amount up to approximately 7.5%, calculated as oxide, of the amount of the phenol until a soluble phenol-formaldehyde-zinc salt reaction product is obtained.

37. The method which comprises condensing phenol and formaldehyde in the presence of zinc abietate in an amount up to approximately 7.5%, calculated as oxide, of the amount of the phenol until a soluble phenol-formaldehyde-zinc abietate reaction product is obtained.

In testimony whereof I have affixed my signature.

ISRAEL ROSENBLUM.